2,285,538

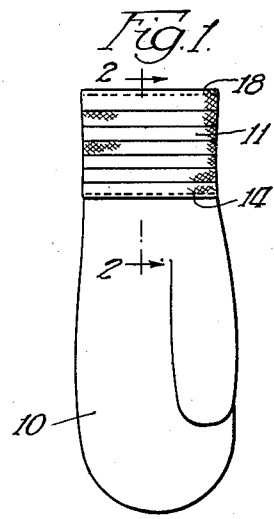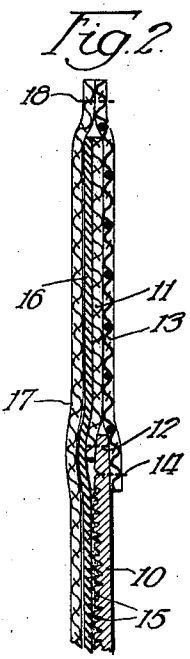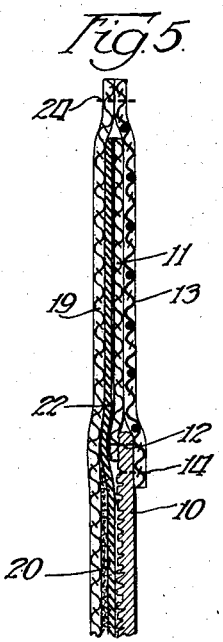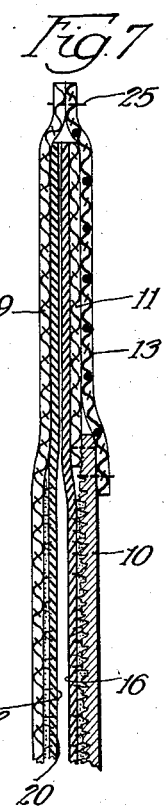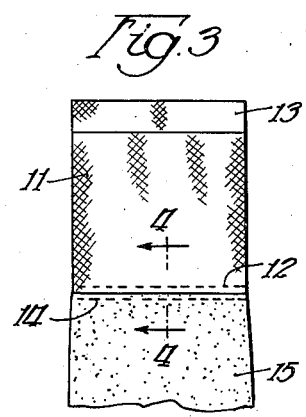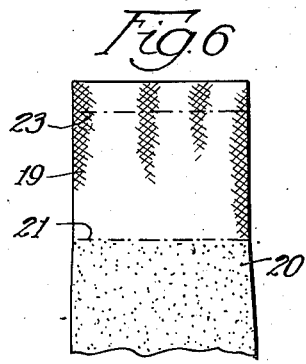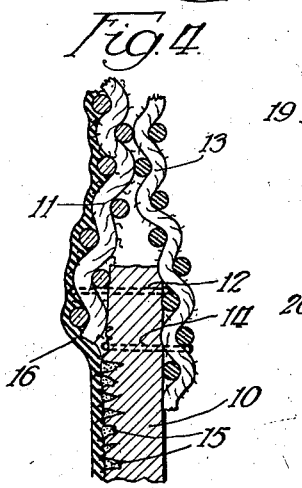
Inventor,
Milton R. Simon Patented June 9, 1942

UNITED STATES PATENT OFFICE 2,285,538

GLOVE

Milton R. Simon, Chicago, Ill., assignor to Western Hosiery Company, Chicago, Ill., a corporation of Illinois Application June 7, 1941, Serial No. 397,046

7 Claims. (Cl. 2—164)

This invention relates to gloves of either the finger type or the mitten type as disclosed in my prior application, Serial No. 352,063, filed August 10, 1940, of which prior application the present application is a continuation in part. It is the object of the invention to provide a waterproofed glove which can be very readily produced and which shall be so arranged as to be soft and pliable regardless of the waterproofed structure.

For attaining the desired waterproofing effect, I have provided one or more thicknesses of rubber between the body of the glove and the lining, the rubber being formed without seams or other openings at any point except at the wrist so as to enable the gloves to protect the hands of the wearer effectively. For insuring the proper size and shape of the rubber portion of the article, the rubber is preferably formed either directly on the leather body of the glove or directly on the lining member, the part receiving the rubber being first covered more or less completely with a powder so as to prevent the rubber from having a firm bond with the cloth or leather at the major portion of their surfaces. When leather is employed having its inner face unfinished, the rubber is bonded loosely to the leather by filaments of the leather projecting through the layer of powder. A very similar result is effected where the rubber is applied to the cloth, the loose shreds of the fibres extending through the powder for loosely bonding the rubber in position. In this way, with the major portion of the layer of rubber only very lightly adhering to the cloth or leather, so as to be movable edgewise with respect thereto, the cloth or leather is left almost as soft and pliable as it was before the application of the rubber.

In the preferred form of mitten shown, the lining is secured in position in the outer ply of the mitten only by a line of stitching at the wrist opening, the rubber portion of the mitten being preferably secured firmly in position by an effective bonding at only a limited zone at the wrist portion of the mitten, where it is bonded directly either to the outer ply or to the lining portion of the mitten. In one form of mitten embodying the invention, two layers of rubber are employed, one bonded at a limited zone with the outer ply of the mitten and the other bonded at a limited zone with the lining. In such case, each of the two layers of rubber is intact and complete independently of the other, the two layers of rubber being operatively connected to each other only through the medium of the connection between the outer ply and the lining at the wrist opening of the mitten.

It is another object of this invention to improve gloves in sundry details hereinafter pointed out. The preferred means by which the several objects have been attained are illustrated in the accompanying drawing, in which—

Fig. 1 is a view of a leather mitten having a fabric wristband and provided with my improvements;

Fig. 2 is a diagrammatic view, being substantially a vertical sectional view taken on a considerably enlarged scale at the line 2—2 of Fig. 1;

Fig. 3 is a view of a portion of the body of a mitten at an intermediate stage in its manufacture, having been turned wrong side out after the connection of an inner wristband and an outer wristband to the leather body, and showing a layer of powder on the leather portion;

Fig. 4 is a vertical sectional view taken on a much enlarged scale at the line 4—4 of Fig. 3, but with a layer of rubber firmly bonded to the wristband and loosely bonded to the leather;

Fig. 5 is a diagrammatic view similar to Fig. 2 but showing a modified construction;

Fig. 6 is a view of a portion of the lining of the mitten of Fig. 5 at an intermediate stage in the production of the mitten, showing a portion of the lining covered with powder;

Fig. 7 is another diagrammatic view similar to Fig. 2 but showing a second modified form of structure; and Fig. 8 is a much enlarged view of a piece of cloth with a layer of rubber bonded firmly thereto at a portion of its surface and with such layer of rubber continued downwardly and bonded only loosely to the adjacent portion of the cloth by reason of the presence of a layer of powder on such adjacent portion of the cloth.

Referring now particularly to Figs. 1, 2 and 3, in which corresponding parts are indicated by the same reference characters, 10 indicates the body portion of a glove of the mitten type, preferably formed of leather with its inner face unfinished. At the upper edge portion of the body 10, an inner wristband portion 11 of fabric is stitched into position at 12, having its lower edge positioned inside of the upper edge of the leather 10, as indicated in Fig. 2. About the inner wristband portion 11, an outer wristband portion 13 is secured, formed of elastic cloth and stitched at 14 to the upper edge portion of the leather 10, such outer wristband portion 13 extending beyond the upper edge of the wristband portion 11, as is clearly shown in Figs. 2 and 3.

When the outer ply of the glove comprising the body portion 10 and the wristband portions 11 and 13 has been formed by the connection of the parts as described, the connected parts are turned wrong side out and a layer of powder 15 is applied on the leather 10 at all points thereabout below the wristband 11. The powder employed is preferably French chalk, the powder being caused to penetrate the interstices of the leather so as to provide a complete unbroken facing on the leather except for the loose shreds or filaments of the leather which extend outwardly through the layer of powder. The unit comprising the body portion 10 and the connected parts is then dipped into a latex solution containing suitable vulcanizing chemicals, the unit being fully immersed in the solution up to the upper edge of the inner wristband 11. By this operation, a thin layer of rubber is formed on the face of the unit, such layer of rubber being intact and unbroken throughout the entire surface. After the formation of the film of rubber, it is dried and vulcanized in a heating chamber having a temperature of about 120°. After the layer of rubber has been dried and vulcanized by being subjected to a temperature of from 120° to 150° F. for a period of from fifteen to twenty minutes, the glove is treated in the same manner a second time if desired for making the film thicker and stronger, the drying and vulcanizing processes being repeated following the second immersion of the unit in the latex solution. After the vulcanizing process has been completed, the rubber surface is preferably powdered with a layer of French chalk, whereupon the unit is ready to be turned right side out for the completion of the glove. The layer of rubber is indicated by reference character 16.

By the employment of the outer ply portion of the glove as a form for the production of the rubber sheath 16, the proper size and shape of the rubber sheath are of course insured. After the completion of the unit including the rubber sheath 16, it will be found that the upper edge portion of the layer of rubber is very firmly bonded to the inner wristband portion 11, but that the portion of the sheath 16 below the inner wristband 11 is bonded loosely with the leather 10 so as to be free to move edgewise with respect to the leather. The leather is thus kept substantially as soft and pliable as it was before the application of the rubber thereto.

After the unit has been turned right side out, a fabric lining member 17 conforming to the size and shape of the unit is slipped into position inside of the unit and stitched at 18 to the upper edge portion of the outer wristband member 13. The glove is then complete and will be found to afford very effective protection with respect to moisture.

In the form of glove as shown in Figs. 5 and 6, the body portion 10 and the wristband portions 11 and 13 are the same as above described in connection with Fig. 2. In this case, however, a lining 19 formed of fabric, substantially like the lining 17, is provided, the powder 20 being applied on the outer face of the lining rather than on the inner face of the unit comprising the leather body portion 10 and the wristbands 11 and 13. After the powder 20 has been applied up to a line at 21 corresponding in position substantially to the lower edge of the wristband portion 13, the lining with its facing 20 of powder is immersed in a rubber latex solution for providing a rubber sheath 22 thereabout, the lining being immersed in the rubber solution up to the line 23, as indicated in Fig. 6. After the formation of the rubber sheath about the lining 19 and its completion by a vulcanization process as above described, with the upper end portion of the rubber sheath strongly bonded to the portion of the lining between the lines 21 and 23, and with the lower portion of the rubber sheath bonded only loosely with the lining so as to move readily edgewise with respect thereto, the lining 19 with the rubber sheath thereabout is slipped into position inside of the unit making up the outer ply of the glove and the inner and outer plies are stitched together at 24.

In the arrangement shown in Fig. 7, the construction is the same as that above described, involving a leather body portion 10 and wristband portions 11 and 13 with a layer of rubber 16 firmly bonded to the band portion 11 and loosely bonded to the leather portion 10. A lining member 19 is also provided, having a rubber sheath 22 bonded strongly to its upper edge portion and bonded loosely to the cloth at its lower portion by reason of the presence of the layer of powder 20. The inner ply comprising the rubber sheath 22 is then slipped into position inside of the outer ply comprising the rubber sheath 16, and the lining 19 and the outer wristband 13 are stitched together at their upper edges at 25 for completing the glove.

By the use of my improved construction, effective protection is provided against moisture, since the rubber sheath is intact and unbroken at all points so as to prevent the passage of moisture therethrough. The elastic wristband 13 serves to hold the mitten closed comfortably about the wrist, this effect being enhanced to a substantial degree by the action of the wrist portion of the rubber sheath which is adapted to expand for the insertion of a hand and then to contract for snug engagement with the wrist.

While I prefer to employ the form and arrangement of parts as shown in my drawing and as above described, my invention is not to be limited to such arrangement except so far as the claims may be so limited, it being understood that changes might well be made in the form and arrangement of the parts without departing from the spirit of the invention.

I claim:

1. In a glove, the combination of an outer ply of fibrous material, an inner lining ply of fabric secured to said outer ply at their wrist openings, and an unbroken rubber sheath between said inner and outer plies and free from one of said plies and bonded only loosely to the other ply through the medium of a comparatively small proportion of the filaments projecting from the face of said other ply for movement with respect thereto except for a limited zone adjacent to the wrist opening at which the rubber is firmly bonded to the major portion of the surface filaments of said other ply.

2. In a glove, the combination of an outer ply comprising a body portion of fibrous material and a wristband portion secured thereto, an inner lining ply of fabric secured to said outer ply at their wrist openings, and an unbroken rubber sheath between said inner and outer plies and free from the inner one of said plies and bonded only loosely to the body portion of said outer ply through the medium of a comparatively small proportion of the filaments projecting from the face of said body portion and bonded firmly to the major portion of the filaments of said wristband portion.

3. In a glove, the combination of an outer ply comprising a body portion of leather and a wristband portion of fabric secured thereto, an inner lining ply of fabric secured to said outer ply at their wrist openings, and an unbroken rubber sheath between said inner and outer plies and free from the inner ply and bonded only loosely to the outer ply for movement with respect thereto except for a limited zone adjacent to the wrist opening at which the rubber is firmly bonded to said wristband portion.

4. In a glove, the combination of an outer ply comprising a body portion of fibrous material and two wristband portions of fabric secured thereto with the outer wristband portion extending beyond the inner wristband portion, an inner lining ply of fabric secured to said outer wristband portion at their wrist openings, and an unbroken rubber sheath between said inner and outer plies and free from one of said plies and only loosely bonded to the other ply for movement with respect thereto except for a limited zone adjacent to the wrist opening at which the rubber is firmly bonded to one of said plies.

5. In a glove, the combination of an outer ply comprising a body portion of leather and two wristband portions of fabric secured thereto with the outer wristband portion formed of elastic cloth and extended beyond the inner wristband portion, an inner lining ply of fabric secured to said outer wristband portion at their wrist openings, and an unbroken rubber sheath between said inner and outer plies and free from said inner ply and only loosely bonded to the outer ply for movement with respect thereto except for a limited zone adjacent to the wrist opening at which the rubber is firmly bonded to the inner wristband portion of said outer ply.

6. In a glove, the combination of an outer ply of fibrous material, an inner lining ply of fabric secured to said outer ply at their wrist openings, and an unbroken rubber sheath between said inner and outer plies and free from the outer ply and bonded only loosely to the inner ply through the medium of a comparatively small proportion of the filaments projecting from the face of said inner ply for movement with respect thereto except for a limited zone adjacent to the wrist opening at which the rubber is firmly bonded to the major portion of the surface filaments of the inner ply.

7. In a glove, the combination of an outer ply of fibrous material, an inner lining ply of fabric secured to said outer ply at their wrist openings, an unbroken rubber sheath between said inner and outer plies and free from the inner ply and bonded loosely to the outer ply for movement with respect thereto except for a limited zone adjacent to the wrist opening at which the rubber is firmly bonded to the outer ply, and a second unbroken rubber sheath between said inner ply and said first-named rubber sheath and free from said first-named sheath and loosely bonded to the inner ply for movement with respect thereto except for a limited zone adjacent to the wrist opening at which the rubber is firmly bonded to said inner ply.

MILTON R. SIMON.